(12) United States Patent
Surendran et al.

(10) Patent No.: US 9,980,016 B2
(45) Date of Patent: *May 22, 2018

(54) VIDEO CONTEXTUAL ADVERTISEMENTS USING SPEECH RECOGNITION

(75) Inventors: Arungunram C. Surendran, Sammamish, WA (US); Patrick Nguyen, Seattle, WA (US); Milind V. Mahajan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1564 days.

This patent is subject to a terminal disclaimer.

(21) Appl. No.: 13/459,435

(22) Filed: Apr. 30, 2012

(65) Prior Publication Data

US 2012/0215630 A1   Aug. 23, 2012

Related U.S. Application Data

(63) Continuation of application No. 12/134,214, filed on Jun. 6, 2008, now Pat. No. 8,190,479.

(Continued)

(51) Int. Cl.
*G06Q 30/00*       (2012.01)
*H04N 21/8405*     (2011.01)
(Continued)

(52) U.S. Cl.
CPC ......... *H04N 21/8405* (2013.01); *G06Q 30/02* (2013.01); *G06Q 30/0255* (2013.01);
(Continued)

(58) Field of Classification Search
CPC ........... G06Q 30/0251; G06Q 30/0255; G06Q 30/0269; H04N 21/440236; G10L 15/265
(Continued)

(56) References Cited

U.S. PATENT DOCUMENTS 7,805,740 B2    9/2010   Gilboa et al.
8,042,063 B1   10/2011   Lin-Hendel
(Continued)

FOREIGN PATENT DOCUMENTS

JP    2003186892 A    7/2003
KR       100616805 B1    8/2006
WO    WO0150296 A2    7/2001

OTHER PUBLICATIONS

Digitalsmiths Unveils Contextual Video Ad Solutions, Sep. 6, 2007, http://www.dmnews.com/marketing-strategy/digitalsmiths-unveils-contextual-video-ad-solutions/article/98395/, 2pp (Year: 2007).*

(Continued)

*Primary Examiner* — Daniel Lastra
(74) *Attorney, Agent, or Firm* — Christopher J. Volkmann; Kelly, Holt & Christenson, PLLC

(57) ABSTRACT

Embodiments of a computer-implemented advertisement display system are disclosed. In one embodiment, the system includes a speech recognition component that processes a video clip and produces a corresponding collection of speech recognition data indicative of an audio portion of the video clip. The system also includes a collection of advertising material. An advertisement selection component selects an advertisement from the collection of advertising material based on the corresponding collection of speech recognition data. The system also includes a display. An advertisement presentation component displays an indication of the selected advertisement on the display during a simultaneous display of the video clip.

20 Claims, 6 Drawing Sheets

Related U.S. Application Data

(60) Provisional application No. 61/025,498, filed on Feb. 1, 2008.

(51) Int. Cl.

| | | |
|---|---|---|
| *G06Q 30/02* | (2012.01) | |
| *H04N 21/4402* | (2011.01) | |
| *H04N 21/466* | (2011.01) | |
| *H04N 21/81* | (2011.01) | |
| *G10L 15/26* | (2006.01) | |

(52) U.S. Cl.
CPC ..... *G06Q 30/0269* (2013.01); *G06Q 30/0271* (2013.01); *G10L 15/26* (2013.01); *H04N 21/440236* (2013.01); *H04N 21/4668* (2013.01); *H04N 21/812* (2013.01)

(58) Field of Classification Search
USPC .............................. 705/14.49, 14.53, 14.66
See application file for complete search history.

(56) References Cited

U.S. PATENT DOCUMENTS

| | | | |
|---|---|---|---|
| 8,190,479 B2* | 5/2012 | Surendran et al. ........ | 705/14.53 |
| 2006/0179453 A1 | 8/2006 | Kadie et al. | |
| 2006/0212897 A1* | 9/2006 | Li ......................... | H04H 60/58 |
| | | | 725/32 |
| 2007/0078708 A1 | 4/2007 | Yu et al. | |
| 2007/0078709 A1* | 4/2007 | Rajaram ............ | G06Q 30/0275 |
| | | | 705/14.71 |
| 2007/0112630 A1 | 5/2007 | Lau et al. | |
| 2007/0157228 A1 | 7/2007 | Bayer et al. | |
| 2007/0174244 A1* | 7/2007 | Jones ................. | G06F 17/3053 |
| 2007/0186165 A1 | 8/2007 | Maislos et al. | |
| 2007/0199017 A1 | 8/2007 | Cozen et al. | |
| 2008/0004953 A1 | 1/2008 | Ma et al. | |
| 2008/0021792 A1* | 1/2008 | Steelberg ........... | G06Q 30/0273 |
| | | | 705/26.3 |
| 2008/0115163 A1* | 5/2008 | Gilboa .................. | G06Q 30/02 |
| | | | 725/34 |
| 2008/0263583 A1 | 10/2008 | Heath | |
| 2008/0300872 A1* | 12/2008 | Basu et al. ..................... | 704/235 |
| 2009/0006937 A1* | 1/2009 | Knapp ............. | G06F 17/30855 |
| | | | 715/205 |
| 2009/0164301 A1* | 6/2009 | O'Sullivan ............ | G06Q 30/02 |
| | | | 705/14.49 |

OTHER PUBLICATIONS

Ryan, J. "Speech Recognition Puts Content into Context", Sep. 6, 2007 1 pg. http://www.speechtechmag.com/Articles/News~News-Feature~Speech-Reconigition-Puts-Content-into-Context-374.

"VideoSense", http://www.digitalsmiths.com/howitworks$_{13}$ advertisers.php.

Mills Elinor, "Adap.Tv Launches Targeted Video Ads", May 13, 2007, pp. 1-3 http://www.news.com/8301-10784_3-9718613-7.html.

O'Malley, G., "BLINKX Launching Speech Recognition Video Search", Jun. 25, 2007, 1 pg. http://www.blinkx.com/article/blinkx-launching-speech-recognition-video-search~419.

International Search Report for Intl. Appln. No. PCT/US2009/030029, filed Jan. 2, 2009.

Written Opinion for Intl. Appln. No. PCT/US2009/030029, filed Jan. 2, 2009.

Best Available Translation of JP2003186892 (Abstract Only).

Notice of Allowance dated Jan. 31, 2012 for related U.S. Appl. No. 12/134,214, filed Jun. 6, 2008.

Office Action dated Sep. 26, 2011 for related U.S. Appl. No. 12/134,214, filed Jun. 6, 2008.

Amendment filed Nov. 1, 2011 for related U.S. Appl. No. 12/134,214, filed Jun. 6, 2008.

"Digitalsmiths unveils contextual video ad solutions", Direct Marketing News, Sep. 6, 2007, downloaded Jan. 21, 2012 from http:/www.dmnews.com/digitalsmiths-unveils-contextual-video-ad-solutions/article/98395/. 8 pages.

\* cited by examiner

VIDEO CONTEXTUAL ADVERTISEMENTS USING SPEECH RECOGNITION

CROSS-REFERENCE TO RELATED APPLICATION

The present application is a continuation of and claims priority of U.S. patent application Ser. No. 12/134,214, filed Jun. 6, 2008, which is based on and claims the benefit of U.S. provisional patent application Ser. No. 61/025,498, filed Feb. 1, 2008, the content of which is hereby incorporated by reference in its entirety.

BACKGROUND

Currently, various content targeted advertising schemes enable the placement of advertisements on Web pages with subject matter similar to that of the advertised product or service. Some schemes implement automated components that select and serve the advertisements based on content displayed by the user. Methods for tailoring advertisements to approximate a consistency with the subject matter of proximately displayed textual content have become sophisticated and well refined.

In contrast, methods for tailoring advertisements to approximate the subject matter of non-textual types of media (video, audio, podcasts, etc.) have not been as fully explored or developed. In fact, focusing advertisements relative to media content such as video on the Web has proven to be a difficult undertaking. Accordingly, advertisements are often not particularly well related to corresponding, non-textual content. Often times, in order to obtain a more focused result in such a scenario, advertisements must be manually selected and assigned to approximate consistency with the subject matter of a particular collection of non-textual content.

The discussion above is merely provided for general background information and is not intended for use as an aid in determining the scope of the claimed subject matter.

SUMMARY

Embodiments of a computer-implemented advertisement display system are disclosed. In one embodiment, the system includes a speech recognition component that processes a video clip and produces a corresponding collection of speech recognition data indicative of an audio portion of the video clip. The system also includes a collection of advertising material. An advertisement selection component selects an advertisement from the collection of advertising material based on the corresponding collection of speech recognition data. The system also includes a display. An advertisement presentation component displays an indication of the selected advertisement on the display during a simultaneous display of the video clip.

This Summary is provided to introduce a selection of concepts in a simplified form that are further described below in the Detailed Description. This Summary is not intended to identify key features or essential features of the claimed subject matter, nor is it intended for use as an aid in determining the scope of the claimed subject matter. The claimed subject matter is not limited to implementations that solve any or all disadvantages noted in the background.

DETAILED DESCRIPTION

Embodiments of the present invention pertain to systems and methods for tailoring advertisements to approximate the subject matter of non-textual types of media. In order to provide an illustrative context, embodiments will be described in relation to a specific type of media, namely video. It is to be understood; however, that the scope of the present invention not limited to video. Those skilled in the art will appreciate that same or similar methods and systems can just as easily be applied to other types of non-textual types of media. Embodiments are particularly well suited for audio-oriented types of media including, but certainly not limited to podcasts, audio news programs, music and the like.

Figure 1:
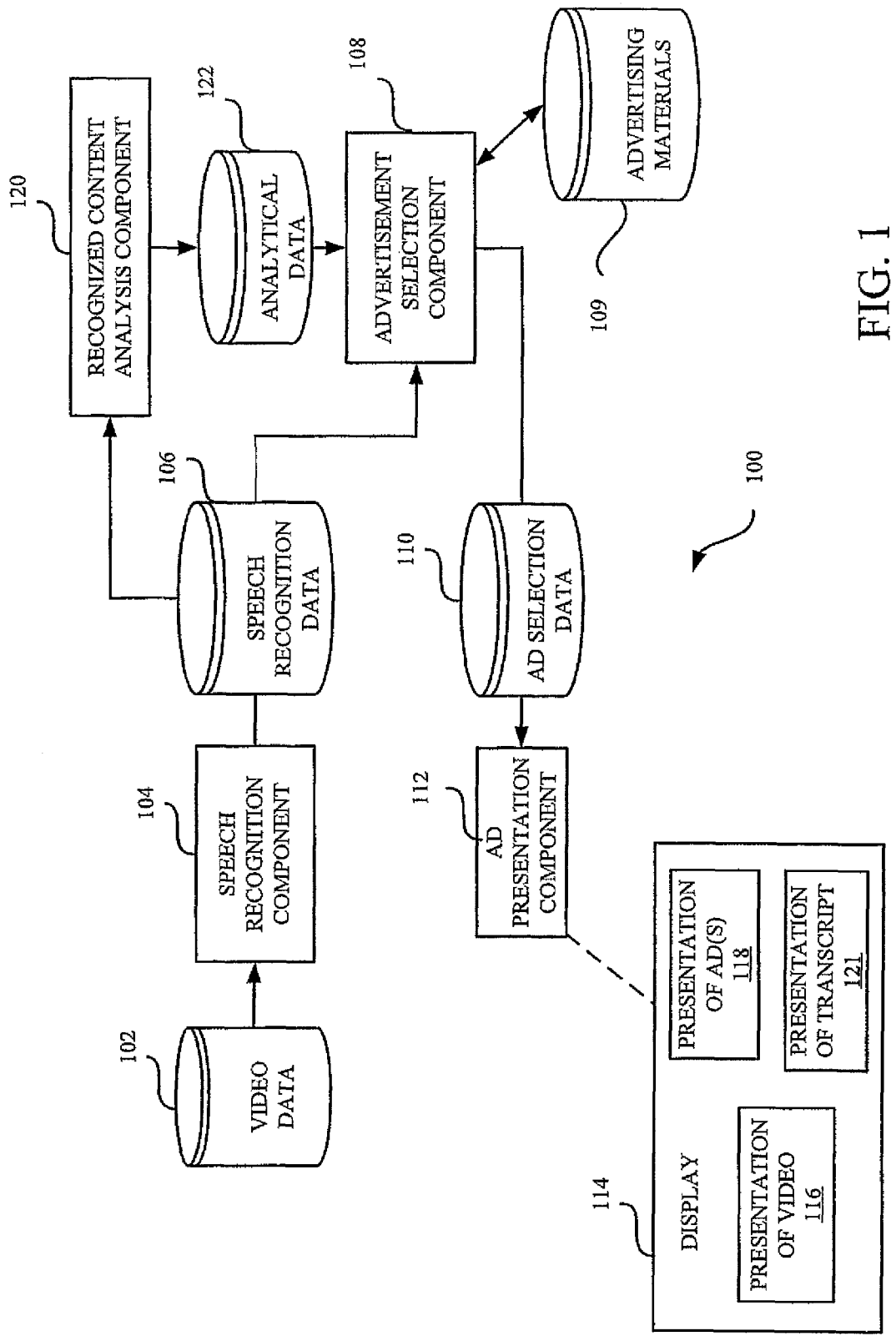
FIG. 1 is a schematic diagram of a video contextual advertisement system.

FIG. 1 is a schematic diagram of a video contextual advertisement system 100. System 100 includes a speech recognition component 104. Component 104 receives video data 102, which is illustratively a digitized video clip, and processes it in order to extract corresponding recognized speech data 106. Data 106 is illustratively a transcript of words spoken (or sung, etc.) within video data 102 (e.g., within the video clip).

Recognized speech data 106 is provided to an advertisement selection component 108. Component 108 analyzes data 106 and, based on that analysis, selects well suited advertisements from a collection 109 of advertising materials. For example, in one embodiment, component 108 selects advertisements that are similar in terms of subject matter to the subject matter of some or all of the recognized speech. In another embodiment, component 108 determines a speaker (or singer, etc.) associated with some or all of the recognized speech, and then selects advertisements that are connected in some way to that speaker. These are just two examples of how component 108 can be configured to select advertisements from materials 109 based on the speech recognition data 106. Those skilled in the art will appreciate that these and many other alternatives should be considered within the scope of the present invention. Additional examples of other possibilities will be discussed below in relation to other Figures.

Upon selection of advertisements from materials 109, an indication 110 of the selections is provided to an advertisement presentation component 112. In one embodiment, data 110 includes actual advertisements. In other embodiment, data 110 also or instead includes a reference indicating from where the actual advertisement or advertisements can be retrieved. In one embodiment, data 110 includes an indication of which advertisement(s) should be displayed with which recognized speech, or which speaker, etc.

Advertisement presentation component 112 facilitates presentation of the advertisement(s) selected by component 108. In one embodiment, component 112 presents the ads in close proximity to a simultaneous presentation of the video upon which the ad selection process was based. In one embodiment, even more narrowly, each ad is presented upon output of audio corresponding to the recognized speech upon which the ad was selected.

For illustratively purposes, advertisement presentation component 112 is shown in conjunction with a display 114. The display includes a presentation 116 of video (e.g., a video clip). The video illustratively is the same as, or corresponds directly to, video data 102. Component 112 facilitates a simultaneous presentation 118 of one or more advertisements 118, as has been described.

Those skilled in the art will appreciate that the actual form of the presented advertisement(s) 118 will vary. The advertisement might be purely visual in nature, such as a banner advertisement or a hyperlink (e.g., a link to a point of commerce or an advertiser-sponsored collection content) within a displayed transcript of words being spoken in the video presentation. In one embodiment, the advertisement is a highlighted word included within the displayed transcript, the highlighted word being selectable so as to trigger a display of advertising material (e.g., clicking on or simply mousing over the highlighted word initiates retrieval and display of associated advertising content). These and many other alternatives should be considered within the scope of the present invention. Additional examples of other possibilities will be discussed below in relation to other Figures.

Those skilled in the art will appreciate that there are many options for configuring advertisement selection component 108 to assign advertisements as described herein. In one embodiment, an analysis component 120 processes recognized data 106 and, based on that analysis, provides a set of analytical data 122 to component 108. Data 106 is illustratively a transcript of recognized speech data, whereas analytical data is more than a simple transcript, such as a derived interpretation of what some or all of the recognized speech represents in a practical sense. For example, data 122 can be representative of who spoke during one or more speech segments represented in data 106. Alternatively, data 122 can be representative of, in a broad categorical sense, what was being spoken about during one or more speech segments represented in data 106. In one embodiment, component 108 is programmed with enough intelligence to select and assign advertisements based on data 106, based on data 122, and/or based on a combination of data 106 and 122.

In one embodiment, components 104 and 120 are programmed to apply acoustic and conversational analysis so as to segment video data 102 into unique segments corresponding to different speaker characteristics (e.g., speaker identity, speaker gender, etc.) and/or different topics. Dividing the content into different topics enables advertisement selection component 108 to target an advertisement for a particular topic when that topic is being displayed or otherwise output. For example, a topic-specific advertisement can be timed for display while a segment of the video that corresponds to that topic is being displayed to the user. Similarly, dividing the content based on who is speaking enables selection component 108 to time an advertisement to correspond to appearances of a particular individual(s) included in the video clip. In one embodiment, this segmentation can be done at various scales—i.e. the entire video can be treated as one conversation or each sub-conversation can be targeted separately, thereby enabling multiple opportunities for the assignment of advertisements.

Those skilled in the art will appreciate that topic analysis and speaker identity analysis are simply examples. Speech recognition data 106 can be processed and analyzed in many different ways to produce many potential data sets. It is within the scope of the present invention to incorporate any such data set into the selection and assignment of advertising material.

In one embodiment, a component 120 processes data 106 and identifies keywords contained in the transcript of recognized speech. Those keywords are provided to the advertisement selection component 108 (e.g., as data 122). Component 108 then selects one or more corresponding advertisements. Based on information received from component 108, ad presentation component 112 manages presentation of the advertisements in association with the corresponding keywords. For example, in one embodiment, an advertisement is presented on display 114 when the corresponding keyword occurs within the speech output of video presentation 116. In another embodiment, the keyword is highlighted (e.g., appears as a hyperlink) within a speech transcript 121 that appears on display 114, the highlighting being an indication that the user can click the keyword and navigate to advertiser-sponsored content. In one embodiment, selecting a keyword triggers presentation of a corresponding advertisement, such as, but not limited to a banner advertisement.

Figure 2:
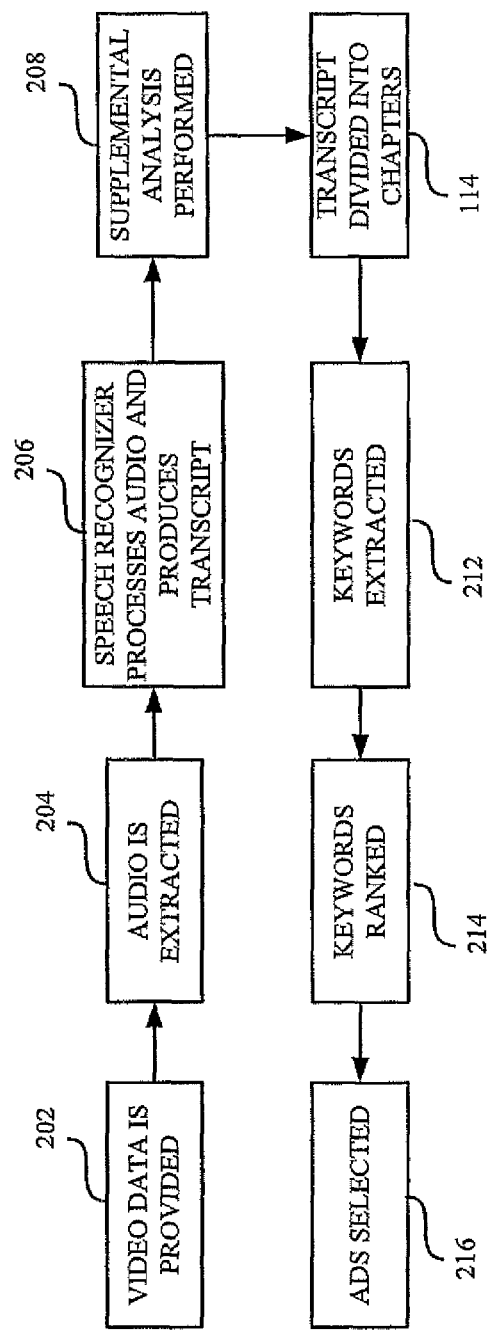
FIG. 2 is a flow chart diagram of a process for selecting/retrieving advertisements based on video content.

FIG. 2 is a flow chart diagram of a process 200 for selecting/retrieving advertisements based on video content. In accordance with block 202, video data (e.g., a video clip) is provided. In accordance with block 204, audio is extracted from the video data. In accordance with block 206, a speech recognizer processes the audio data and develops a corresponding text transcript of recognized speech. In accordance with block 208, one or more of supplemental analysis schemes are applied to the transcript and/or the audio data in order to derive additional information about the video (e.g., the transcript is subject to conversation analysis to identify features of the audio such as subject matter, the audio is subjected to acoustic analysis to identify sources of speech, etc.). In accordance with block 210, the transcript can optionally be divided into segments based on the result of supplemental analysis 208 (e.g. chapters, topics). In accordance with block 212, keywords can optionally be extracted from the transcript. In accordance with block 214, the keywords can be ranked (or re-ranked) based on number of factors (e.g., a given keyword might be given priority over another keyword to a particular advertising opportunity based on a factor such as how much the advertisers paid for their respective keywords, based upon how much the advertisers pay for user traffic, etc.). In accordance with block 216, advertisements are selected based on information derived in any or all of the preceding steps. For example, ads are illustratively selected and assigned based on a determined applicability to a particular keyword, keyword ranking, topic chapter, speaker, etc.

In one embodiment, when ads are actually displayed or otherwise presented to a user during presentation of the corresponding video clip, the ads transition automatically to match the current status of the video output. For example, in one embodiment, the ads change automatically when a conversation in the video moves from one topic to another, or from one speaker to another, etc.

Figure 3:
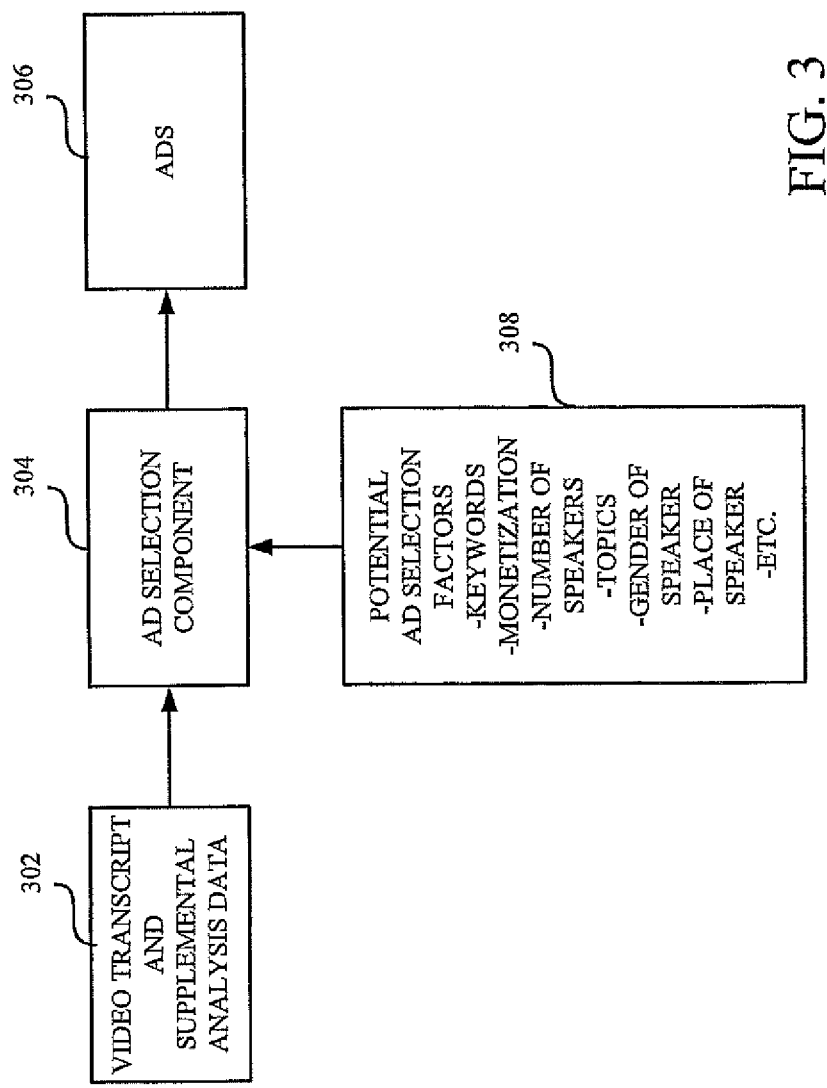
FIG. 3 is a schematic flow diagram demonstrating an advertisement selection process.

FIG. 3 is a schematic flow diagram demonstrating an embodiment of the described advertisement selection process. This diagram makes it clear that, in one embodiment, an advertisement selection component 304 can be configured to select advertisements 306 based on a received video transcript and/or any supplemental analysis data. Further, as is demonstrated by block 308, the selection process can be configured to take other factors into account in the ad selection process and/or the ad display transition process.

Such other factors can include, but are not limited to, keyword considerations, keyword ranking considerations, monetary considerations, the number of speakers, the gender of speakers, the location of the speakers, etc. Any combination of these and/or any other factors can be utilized as a basis for selecting ads for display during presentation of the video and/or as a basis for transitioning between ads during presentation of the video.

Figure 4:
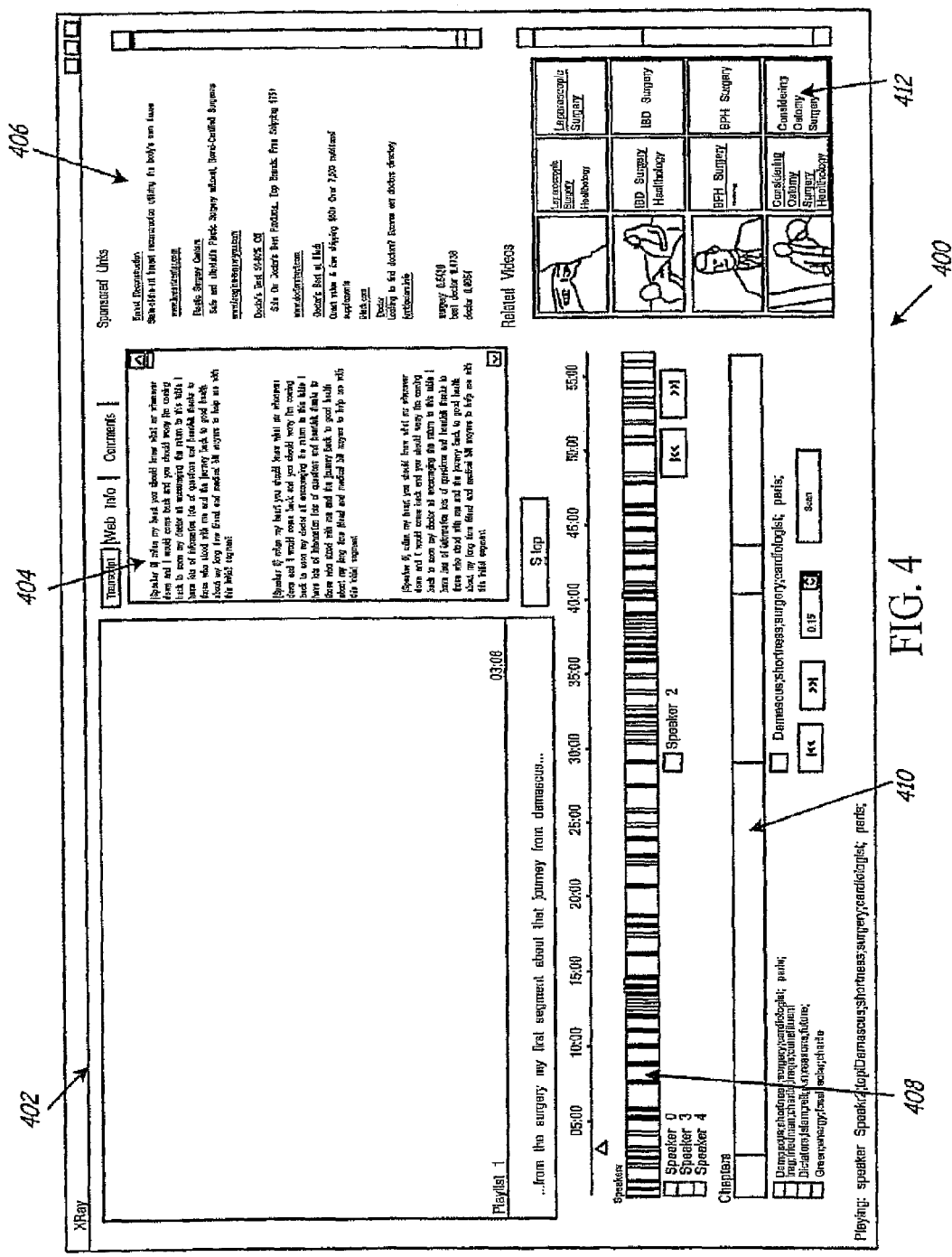
FIG. 4 is an example screen shot.

FIG. 4 is an example screen shot 400. Screen shot is one example of what a user display configured to support embodiments of the present invention might look like. In particular, screen shot 400 is configured to output advertising material that is closely tailored to the content of a simultaneously displayed video. Screen shot 400 displays the video within an area 402.

Within an area 404, a transcript (i.e., textual representation of recognized speech content) that corresponds to the video displayed in area 402 is displayed. In one embodiment, advertising material is incorporated into area 404 based on the content of the video. For example, words within the transcript may appear as hyperlinks that can be navigated by the user in order to access advertiser-sponsored content. As has been described in relation to other Figures, advertisements promoted within area 404 are illustratively selected based on content characteristics of the video shown within area 402.

More traditional advertisements such as, but not limited to, banner and classified style ads are illustratively displayed within an area 406. As has been described in relation to other Figures, advertisements promoted within area 406 are illustratively selected based on content characteristics of the video shown within area 402.

Access to additional video clips is provided within an area 412. Videos and/or commercials promoted within area 406 are illustratively selected based on content characteristics of the video shown within area 402. In one embodiment, as has been described, advertisements incorporated into sections 404, 406 412, or elsewhere within the display are selected and presented so as to be relevant to the subject matter content of the video displayed in area 402. For example, if the video is related to surgery, then displayed ads will illustratively also be related to surgery.

Other information about the video can also be displayed. For example, screen shot 400 includes an indicator 408 that shows when various speakers are speaking during the video. Indicator 408 assigns a color to each speaker (e.g., speaker 0, speaker 2, speaker 3 and speaker 4). Indicator shows, through corresponding color-coded blocks, who speaks over the course of the entire video clip. Similarly, indicator 410 provides, on a color-coded basis, an overview of the topics discussed during the course of the entire video clip. The user can illustratively click anywhere on either of indicators 408 and 410 in order to "jump" to a different point in the video clip, for example, if they are interested in a particular speaker or topic. As has been alluded to, advertisements may automatically change within area 404, 406, 412 or elsewhere in the display depending upon which segment of indicator 408 and/or 410 is currently being displayed in area 402.

Figure 5:
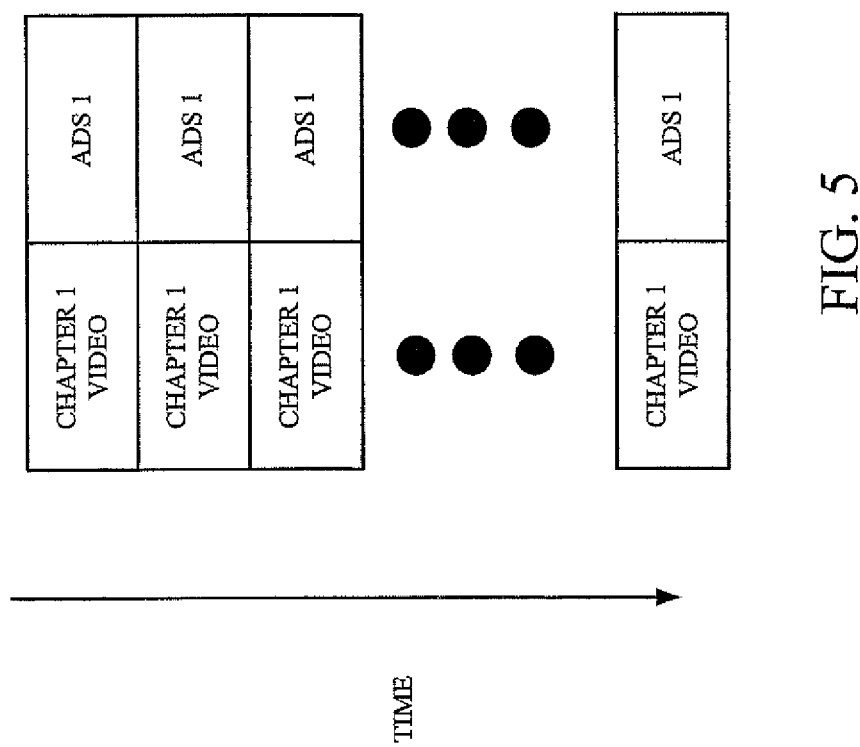
FIG. 5 is a schematic illustration demonstrating how ads are assigned to different video chapters.

FIG. 5 is a schematic illustration demonstrating how ads are assigned to different video chapters (e.g., different topics, different speakers, etc.). As is shown in FIG. 5, different advertisements are assigned to different related video segments over time. The ads transition from one to the next dynamically as the video progresses through the various chapters. For example, as the chapter 1 video is displayed, one or more ads 1 are displayed alongside. When the chapter 2 video is displayed, the ads are dynamically updated and a different set of advertisements, denoted as ads 2, is displayed. The display of ads is illustratively automatically updated for each chapter of video that is currently displayed.

Figure 6:
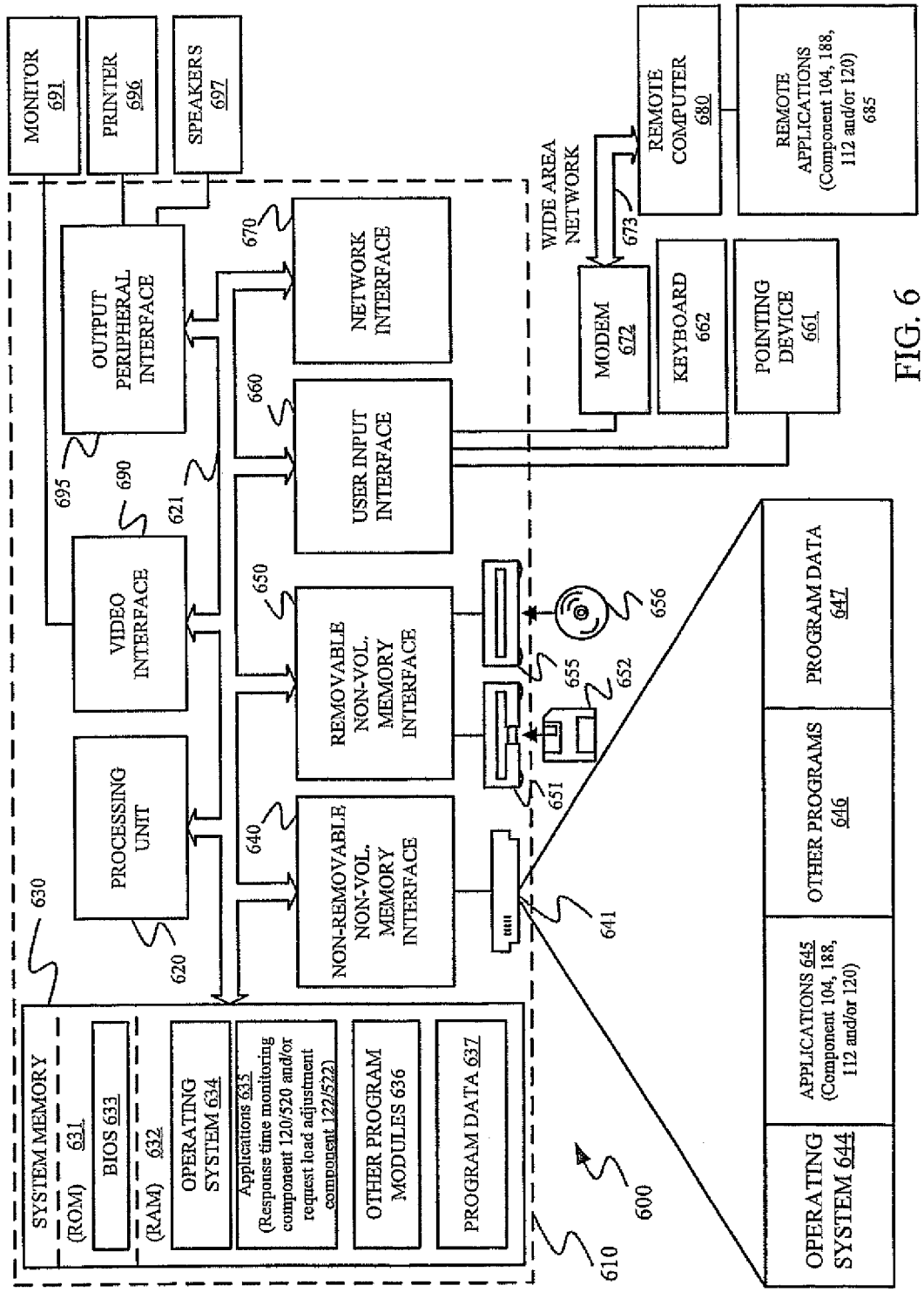
FIG. 6 illustrates an example of a computing system environment.

FIG. 6 illustrates an example of a suitable computing system environment 600 in which embodiments may be implemented. The computing system environment 600 is only one example of a suitable computing environment and is not intended to suggest any limitation as to the scope of use or functionality of the claimed subject matter. Neither should the computing environment 600 be interpreted as having any dependency or requirement relating to any one or combination of components illustrated in the exemplary operating environment 600.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments have been described herein in the general context of computer-executable instructions, such as program modules, being executed by a computer. Generally, program modules include routines, programs, objects, components, data structures, etc. that perform particular tasks or implement particular abstract data types. Embodiments can be practiced in distributed computing environments where tasks are performed by remote processing devices that are linked through a communications network. In a distributed computing environment, program modules can be located on both (or either) local and remote computer storage media including memory storage devices.

With reference to FIG. 6, an exemplary system for implementing some embodiments includes a general-purpose computing device in the form of a computer 610. Components of computer 610 may include, but are not limited to, a processing unit 620, a system memory 630, and a system bus 621 that couples various system components including the system memory to the processing unit 620.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637. Applications 635 are shown as including any or all of components 104, 108, 112 and 120, which are described in relation to FIG. 1. Any or all of data 102, 106, 122, 109 and 110 can also be stored within the system memory. This is but one example of a possible implementation.

The computer 610 may also include other removable/non-removable volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. Applications 645 are shown as including any or all of components 104, 108, 112 and 120, which are described in relation to FIG. 1. Any or all of data 102, 106, 122, 109 and 110 can also be stored with component 641. This is but one example of a possible implementation.

A user may enter commands and information into the computer 610 through input devices such as a keyboard 662 and a pointing device 661, such as a mouse, trackball or touch pad. Other input devices (not shown) may include a joystick, game pad, microphone, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 is operated in a networked environment using logical connections to one or more remote computers, such as a remote computer 680. The logical connection depicted in FIG. 6 is a wide area network (WAN) 673, but may also or instead include other networks. Computer 610 includes a modem 672 or other means for establishing communications over the WAN 673, such as the Internet. The modem 672, which may be internal or external, may be connected to the system bus 621 via the user-input interface 660, or other appropriate mechanism. Remote computer 680 is shown as operating remote applications 685. Applications 685 are shown as including any or all of components 104, 108, 112 and 120, which are described in relation to FIG. 1. Any or all of data 102, 106, 122, 109 and 110 can also be remotely stored. This is but one example of a possible implementation.

It is worth mentioning that the scope of the present invention is broad enough to encompass the selection and assignment of advertising material based on any audio content derived from a video clip. With reference to FIG. 1, a specific embodiment was described wherein a speech recognition component 104 analyzes video data 102 and derives corresponding speech recognition data 106. It is to be understood that the scope of the present invention is not limited to speech recognition and speech recognition components per se. Component 104 can be any type of audio analysis component capable of producing a collection of data 106 (based on the audio content of video data 102) upon which assumptions can be made to support component 108 in making selections of advertising material. For example, component 104 may just as easily be configured to perform another type of audio analysis that produces a different basis for the selection of advertising material. For example, the selection of advertisements can be based on an identification of sounds that occur within video data 102 (e.g., a sound of a tennis ball hitting a racket, a sound of a lion roaring, etc.), an identification of a type of music (e.g., country music, church music, etc.), or another other type of classification of audio information.

In reference to FIG. 5, an embodiment was described wherein the initiation and/or termination of a presentation of an advertisement is timed to coincide with the initiation and/or termination of an event (e.g., a so-called "chapter") within the video clip, as determined based on analysis of the audio information. It is to be understood that the present invention is not limited to any particular type of event or events within the video clip that trigger such transitions. For example, a transition can be triggered based on a transition between speakers, between groups of speakers, between topics of conversation, or based on any other audio oriented event (e.g., a particular sound, the start of music, etc.) that is determinable by an audio analysis component.

In reference to FIG. 4, a display embodiment was described wherein bars such as bars 408 and 410 can be provided to provide a visual indication of how the video displayed in area 402 has been broken down based on audio analysis (e.g., based on transitions between speakers, between subject matter topics, etc.). In one embodiment, the user is able to adjust the granularity these types of bars included in the display. For example, the user can illustrative provide input that causes bar 410 to "zoom in" its focus (e.g., include more subject matter topic divisions that are more specific in nature) or "zoom out" its focus (e.g., include fewer subject matter topic divisions that are broader or less specific in nature). In one embodiment, advertisements are assignable to any of the identified sub-components. In one embodiment, preferences are implemented (e.g., by ad presentation component 112) that dictate what advertisement is displayed when there is a conflict between two ads based on a selected level of granularity. For example, when bar 410 is zoomed out to its maximum scope of granularity, an ad associated with one of the broadest identified categories may be given preference (e.g., in terms of what gets displayed) over an ad associated with a narrow category that is not identified as a category in relation to bar 410. Or, if there is no ad associated with the broadest identified category, the system may default to ads associated with the next level down in terms of the currently selected level of granularity. Of course, bar 408 and any other similar display component can be configured to operate similarly in terms of implementing adjustable granularity. Those skilled in the art will appreciate that there are many ways to implement advertisement selection and display within a system with adjustable granularity as described. The scope of the present invention is not limited to any of the examples provided herein. It is within the scope of the present invention that granularity be adjustable, and that, through adjustments to the granularity, the user may be given the control to adjust how and when (and/or which) they are shown advertisements.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   identifying a video to be rendered;
   processing the video to identify an audio portion of the video, the audio portion comprising speech from at least one speaker;
   performing speech recognition on the audio portion, with a computer-implemented speech recognition component, to obtain recognized speech data;
   identifying keywords in the recognized speech data;
   dividing the video into a plurality of different chapters based on the identified keywords;
   identifying a collection of supplemental content items, each supplemental content item comprising content other than the video;
   for each chapter of the plurality of different chapters,
      ranking the collection of supplemental content items based on the keywords;
      selecting one of the supplemental content items based on the ranking; and
      assigning the selected supplemental content item to the chapter, wherein the selected supplemental content item supplements video content in the chapter;
   rendering the video on a display device; and
   during rendering of the video, identifying occurrence of rendering each chapter in the video and, for each chapter synchronizing display of the chapter with an indication of the supplemental content item assigned to the chapter.

2. The method of claim 1, wherein dividing the video into a plurality of different chapters comprises:
   analyzing the keywords in the recognized speech data to identify a transition between subject matter topics; and
   dividing the video into a first chapter and a second chapter based on the identified transition between the subject matter topics.

3. The method of claim 1, further comprising identifying a subject matter transition between the plurality of different chapters based on an analysis of keywords in the recognized speech data.

4. The method of claim 3, wherein dividing the video into a plurality of different chapters comprises dividing the video into the plurality of different chapters based on the subject matter transition.

5. The method of claim 1, further comprising identifying a transition between speakers.

6. The method of claim 5, wherein dividing the video into the plurality of different chapters comprises dividing the video into the plurality of different chapters based on the transition between speakers.

7. The method of claim 1, further comprising:
   generating, using the speech recognition component, a textual transcript of at least some of the audio portion of the video; and
   displaying the textual transcript while the corresponding portion of the video is being displayed.

8. The method of claim 7, wherein synchronizing display comprises hyperlinking at least one keyword contained within the textual transcript.

9. A computing system comprising:
   at least one processor; and
   memory storing instructions executable by the at least one processor, wherein the instructions, when executed, configure the computing system to provide:
      a speech recognizer configured to perform speech recognition, on an audio portion of a video signal, to generate a transcription of the audio portion;
      a recognized content analysis component configured to analyze the transcription of the audio portion and identify a keyword included in the transcription;
      a supplemental content selection component configured to select a supplemental content item from a collection of supplemental content items based on the keyword included in the transcription; and
      a display component configured to simultaneously display video, corresponding to the video signal, and text corresponding to the transcription, the displayed text including the keyword included in the transcription and at least one hyperlink that links the keyword to the selected supplemental content item.

10. The computing system of claim 9, wherein when the supplemental content selection component selects the supplemental content item from the collection of supplemental content items it does so as a function of a speaker identified as speaking during the audio portion of the video.

11. The computing system of claim 9, wherein the supplemental content selection component selects the supplemental content item in response to a determination that the keyword is a word to which the supplemental content item is to be assigned.

12. The computing system of claim 9, wherein when the supplemental content selection component selects the supplemental content item from the collection of supplemental content items it does so as a function of a value of a word in the transcription identified as being the keyword.

13. A computer-implemented method comprising:
identifying a video;
identifying an audio portion of the video;
performing speech recognition on the audio portion, using a speech recognizer, to obtain speech recognition data;
dividing the video into a plurality of different chapters based on the speech recognition data;
identifying a collection of supplemental content items, each supplemental content item comprising content other than the video;
for each chapter of the plurality of different chapters,
 ranking, by a computer processor, the collection of supplemental content items for the chapter based on the speech recognition data corresponding to the chapter,
 selecting one of the supplemental content items based on the ranking, and
 assigning the selected supplemental content item to the chapter, wherein the selected supplemental content item supplements video content in the chapter, and
rendering the video on a display device; and
during rendering of the video, identifying occurrence of rendering each chapter in the video and, for each chapter, synchronizing display of the chapter with an indication of the supplemental content item assigned to the chapter.

14. The method of claim 13, wherein selecting one of the supplemental content items comprises selecting one of the supplemental content items based at least in part on a function that is based on an identity of a speaker identified in the chapter.

15. The method of claim 13, wherein ranking the collection of supplemental content items for each chapter comprises ranking keywords identified within the speech recognition data corresponding to the chapter.

16. The method of claim 13, wherein assigning the selected supplemental content item to the chapter comprises assigning based in part on a function that accounts for an identification of a person speaking during the chapter.

17. The method of claim 13, wherein assigning the selected supplemental content item comprises assigning based in part on a function that accounts for distinguishing between speakers.

18. The method of claim 13, wherein synchronizing display comprises displaying a hyperlink to the selected supplemental content and not displaying the selected supplemental content until the hyperlink is selected.

19. The method of claim 13, wherein ranking the collection of supplemental content items for each of the different chapters comprises ranking based on a keyword model.

20. The method of claim 19, wherein ranking the collection of supplemental content items comprises ranking based on keywords included in each of the different chapters.

* * * * *